US008643716B1

(12) United States Patent
Kalokitis et al.

(10) Patent No.: US 8,643,716 B1
(45) Date of Patent: Feb. 4, 2014

(54) METHOD AND SYSTEM FOR MOBILE STEAM LEAK DETECTION

(75) Inventors: David Kalokitis, Robbinsville, NJ (US); Jonathan Lloyd Schepps, Princeton Junction, NJ (US); Peng Chang, West Windsor, NJ (US)

(73) Assignee: Power Survey LLC, Kearny, NJ (US)

( * ) Notice: Subject to any disclaimer, the term of this patent is extended or adjusted under 35 U.S.C. 154(b) by 961 days.

(21) Appl. No.: 12/371,362

(22) Filed: Feb. 13, 2009

Related U.S. Application Data

(60) Provisional application No. 61/065,532, filed on Feb. 13, 2008.

(51) Int. Cl.
*H04N 7/18* (2006.01)

(52) U.S. Cl.
USPC ............. 348/125; 348/84; 340/588; 340/589; 340/622; 340/625

(58) Field of Classification Search
USPC ............... 348/84, 125; 340/588–59, 622, 625
See application file for complete search history.

(56) References Cited

U.S. PATENT DOCUMENTS

| | | | |
|---|---|---|---|
| 4,555,627 A * | 11/1985 | McRae, Jr. ................... 250/334 |
| 5,001,346 A * | 3/1991 | Barkhoudarian ............. 250/330 |
| 6,173,231 B1 * | 1/2001 | Chojnacki ..................... 701/409 |
| 7,528,372 B2 * | 5/2009 | Garvey et al. ................. 250/330 |
| 7,533,635 B2 * | 5/2009 | Bradley et al. ............. 123/41.29 |
| 8,019,501 B2 * | 9/2011 | Breed .......................... 701/31.9 |
| 2004/0003914 A1 * | 1/2004 | Avila ........................... 165/11.1 |
| 2004/0176127 A1 * | 9/2004 | Ballantyne et al. ......... 455/552.1 |
| 2008/0139114 A1 * | 6/2008 | Ranganathan ............... 455/41.1 |
| 2008/0150737 A1 * | 6/2008 | Karschnia .................... 340/605 |
| 2008/0179409 A1 * | 7/2008 | Seem .......................... 236/49.3 |

* cited by examiner

*Primary Examiner* — Duyen Doan
(74) *Attorney, Agent, or Firm* — Moser Taboada

(57) ABSTRACT

A method and system for steam leak detection. The method comprises obtaining real-time temperature data representing a heat dissipation of a steam pipe along a steam pipe route, processing the real-time temperature data in real-time to determine at least one indication of a potential steam leak based on the real-time temperature data and to generate a processed image for display, and displaying the processed image to depict the heat dissipation of the steam pipe.

20 Claims, 7 Drawing Sheets

METHOD AND SYSTEM FOR MOBILE STEAM LEAK DETECTION

CROSS-REFERENCE TO RELATED APPLICATIONS

This application claims benefit of U.S. provisional patent application Ser. No. 61/065,532, filed Feb. 13, 2008, which is herein incorporated in its entirety by reference.

BACKGROUND OF THE INVENTION

1. Field of the Invention

Embodiments of the present invention generally relate to steam leak detection, and, more particularly, to a method and system for mobile detection of steam leaks.

2. Description of the Related Art

District heating systems, such as those used in major metropolitan areas, distribute heat generated in a centralized location for residential and commercial heating requirements. One method of distributing the generated heat is via a network of pipes transporting steam. Typically, the steam pipes are subterranean and the steam pipe network may cover a very large geographical area.

One disadvantage of district heating systems using subterranean steam pipes is the potential for undetected steam leaks to occur. A steam leak may lead to a loss in efficiency of the heating system or to a potentially lethal situation such as an explosion. It is therefore critical to identify steam leaks in a steam pipe system as quickly as possible so that they can be immediately repaired. However, current methods of steam leak detection do not provide a highly reliable solution to the problem, particularly where geographically large networks of steam pipes are involved.

Therefore, there is a need in the art to be able to efficiently and reliably detect steam leaks from steam pipe systems, particularly large metropolitan steam pipe systems.

SUMMARY OF THE INVENTION

Embodiments of the present invention relate to a method and system for steam leak detection. The method comprises obtaining real-time temperature data representing a heat dissipation of a steam pipe along a steam pipe route, processing the real-time temperature data in real-time to determine at least one indication of a potential steam leak based on the real-time temperature data and to generate a processed image for display, and displaying the processed image to depict the heat dissipation of the steam pipe.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
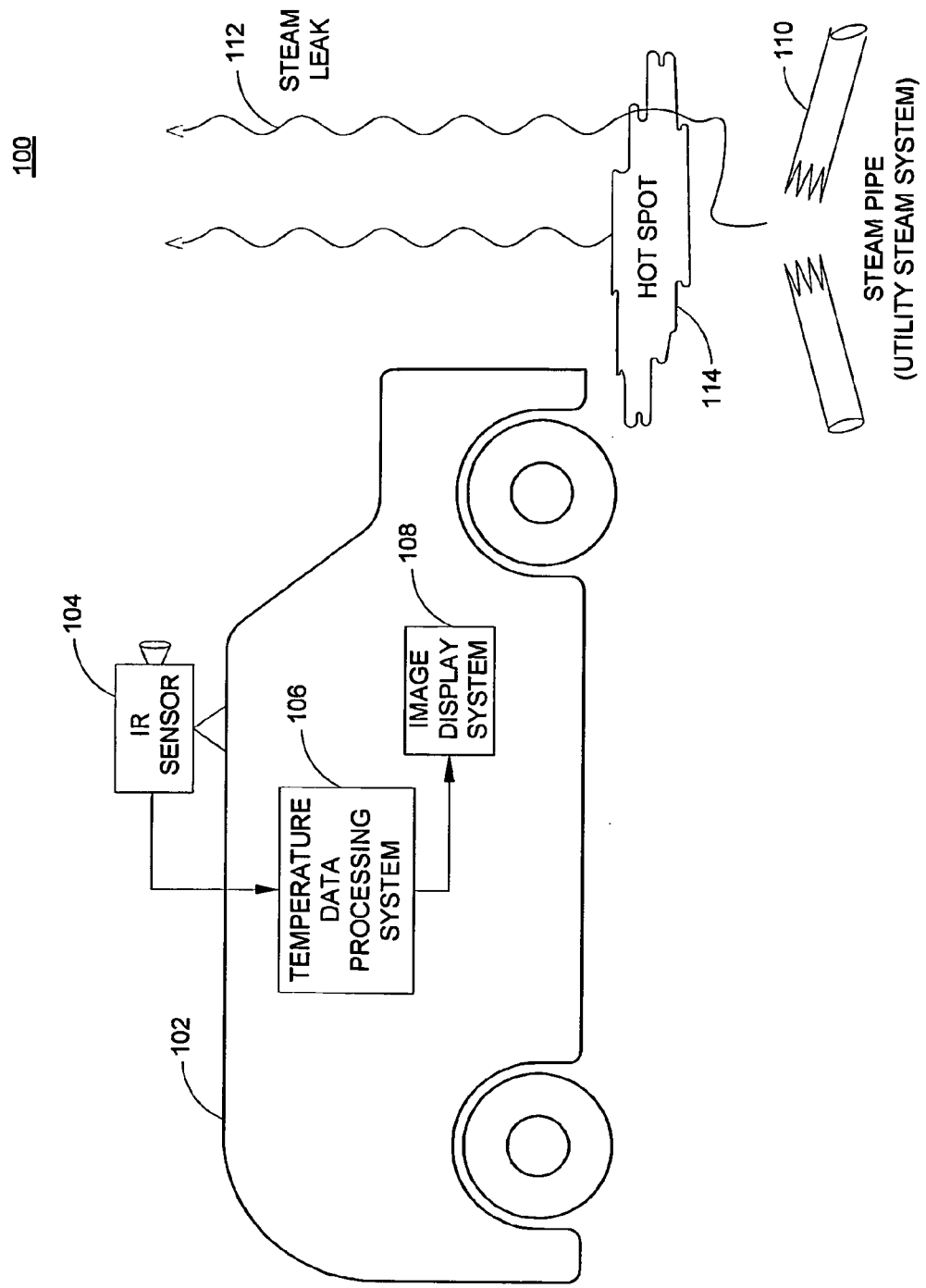
FIG. 1 is a block diagram of a system for mobile steam leak detection in accordance with one or more embodiments of the present invention.

FIG. 1 is a block diagram of a system 100 for mobile steam leak detection in accordance with one or more embodiments of the present invention. The system 100 comprises a mobile vehicle 102 and an infrared (IR) sensor 104 mounted to the mobile vehicle 102. The IR sensor 104 is coupled to a temperature data processing system 106, and an image display system 108 is coupled to the temperature data processing system 106. A subterranean steam pipe 110 is depicted in FIG. 1, along with a steam leak 112 from the steam pipe 110. The steam leak 112 results in a region of extreme heat localized to the site of the steam leak 112, i.e., a "hot spot" 114, which forms in the roadway.

The mobile vehicle 102 may be any type of mobile car, van, bus, and the like, and is used to traverse a route along which steam pipes, such as the subterranean steam pipes 110, are located. The IR sensor 104 is mounted by any appropriate means and in any location on the mobile vehicle 102 such that the IR sensor 104 can detect IR energy along the route (i.e., the steam pipe route) traversed by the mobile vehicle 102. In alternative embodiments, any one of a variety of mobile units may be utilized to traverse the route with the IR sensor 104, for example the IR sensor 104 may be mounted on a pushcart, or a person may carry the IR sensor 104 by hand. The IR sensor 104 can be any type of device that detects IR energy; in one embodiment, the IR sensor 104 is a forward looking infrared (FLIR) A40M IR Camera.

The IR energy detected by the IR sensor 104 along the route of travel results in real-time temperature data (i.e., digital radiometric image data) depicting electromagnetic (EM) energy variations (i.e., thermal variations) along the route. Thus, the IR sensor 104 provides real-time temperature data that forms thermal images of the steam pipe route. Since steam pipe systems generally have a visible surface signature in the IR spectrum, the real-time temperature data may be displayed to a user, for example as a pseudo-colored image, to aid in navigating the steam pipe route.

The real-time temperature data obtained along the route is coupled to the temperature data processing system 106; in one or more embodiments, the temperature data processing system 106 comprises a commercially available laptop. The temperature data processing system 106 processes the real-time temperature data in real time to identify relevant structures of the steam pipe route depicted within the data, such as steam pipes 110 and manholes, and to identify differences between the real-time temperature data for such relevant structures and previously obtained baseline data that may indicate potential steam leaks. The temperature data processing system 106 further generates a processed image for display based on such processed data; in some embodiments, the processed image depicts detected relevant structures along with indications of potential leaks. The temperature data processing system 106 may additionally store some or all of the real-time temperature data, as well as temperature-related parameters derived from the real-time temperature data.

The image display system 108 is coupled to the temperature data processing system 106 and provides a means for a live display of raw data, such as pseudo-colored imagery of the real-time temperature data, and/or the processed image. In some embodiments, imagery of the baseline data may be displayed, for example as a pseudo-colored image.

In an alternative embodiment, the mobile vehicle 102 (or mobile unit) may additionally comprise a standard (visual range) image sensor (e.g., video camera) that images the roadway and surrounding area, and/or vehicle navigational tools such as vehicle motion sensors ("wheel sensors"), for providing geographical references. The visual images from the image sensor and information from the wheel sensors can be used to identify the location of the vehicle along the steam pipe route.

In some embodiments, such as the embodiment described above, the real-time temperature data is collected using a thermal imaging device such that the data can be represented as a thermal image. Images comprising the real-time temperature data and/or images comprising temperature-related parameters are then processed using image processing techniques, as further described below, to detect potential steam leaks. Additionally and/or alternatively, other techniques may be used to collect and/or process temperature data to identify potential steam leaks. Such temperature data may comprise one or more of discrete temperature or thermal information, a temperature or thermal image or images.

Figure 2:
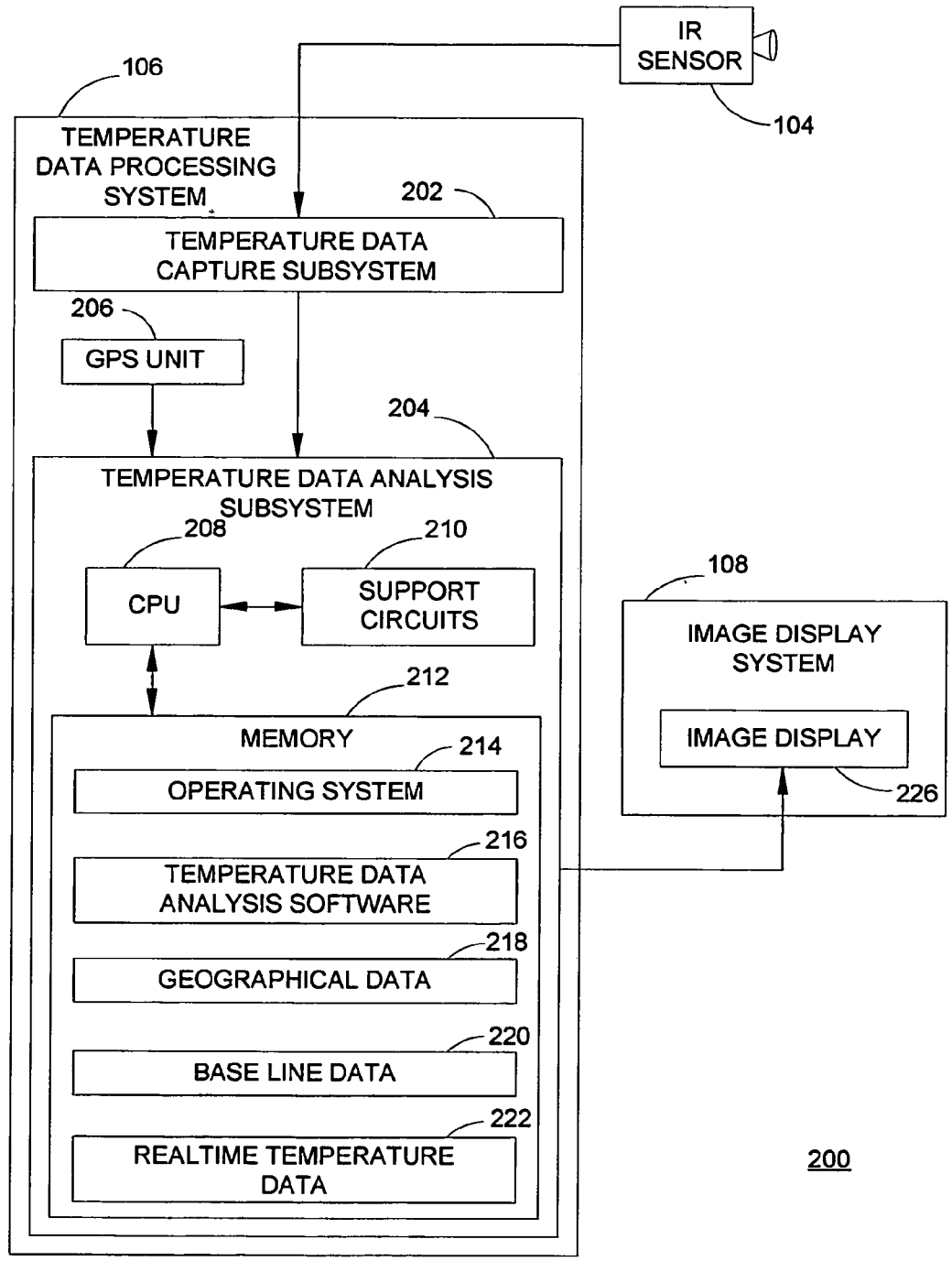
FIG. 2 is a block diagram of a temperature data processing system and an image display system in accordance with one or more embodiments of the present invention.

FIG. 2 is a block diagram of a temperature data processing system 106 and an image display system 108 in accordance with one or more embodiments of the present invention. The temperature data processing system 106 comprises a temperature data capture subsystem 202, which captures the real-time temperature data from the IR sensor 104, coupled to a temperature data analysis subsystem 204. A global positioning system (GPS) unit 206 is additionally coupled to the temperature data analysis subsystem 204 as a reference tool to provide a source of geographical coordinate information.

The temperature data analysis subsystem 204 comprises at least one central processing unit (CPU) 208 coupled to support circuits 210 and a memory 212. The CPU 208 may comprise one or more conventionally available microprocessors. The support circuits 210 are well known circuits used to promote functionality of the CPU 208. Such circuits include, but are not limited to, a cache, power supplies, clock circuits, I/O circuits and the like. The temperature data analysis subsystem 204 may be implemented using a general purpose computer that, when executing particular software, becomes a specific purpose computer for performing temperature data analysis.

The memory 212 of the temperature data analysis subsystem 204 may comprise random access memory, read only memory, removable disk memory, flash memory, and various combinations of these types of memory. The memory 212 is sometimes referred to as main memory and may, in part, be used as cache memory or buffer memory. The memory 212 generally stores the operating system 214 of the temperature data analysis subsystem 204. The operating system 214 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The memory 212 may store various forms of application software, such as temperature data analysis software 216 for processing the real-time temperature data. In addition, the memory 212 may also store various forms of data, such as baseline data 220, real-time temperature data 222 (including in some embodiments processed real-time temperature data), and the like, as well as geographical data 218, such as GPS data, map files or metadata, computer-aided design (CAD) files pertaining to the subterranean steam pipes, and the like. The baseline data 220 results from previously obtained and processed temperature data along the route, as described below with respect to FIG. 3, and may comprise temperature-related data or parameters as well as a plurality of data sets obtained based on the season, time of day, and ambient conditions along the route at the time of capture. The geographical data 218 provides information for mapping the real-time temperature data to a coordinate system, which can then be geo-registered to GPS coordinates obtained from the GPS unit 206.

The temperature data analysis subsystem 204 obtains the real-time temperature data from the temperature data capture subsystem 202 for processing and storage. Such processing may include identifying relevant structures of the steam pipe route (i.e., steam pipes 110 and manholes) represented in the real-time temperature data, extracting relevant temperature data pertaining to the relevant structures (i.e., thermal profiles of steam pipes 110 and manholes) from the real-time temperature data, geo-registering the relevant temperature data to geographical coordinates, and comparing the relevant temperature data with corresponding baseline data to identify any differences indicating a potential steam leak. The corresponding baseline data may be selected from the baseline data 220 in accordance with the season, time of day, and ambient conditions along the steam pipe route at the time of the real-time temperature data capture, as well as geographical coordinates.

The temperature data analysis subsystem 204 performs the temperature data processing in real time to facilitate the rapid identification of any potential steam leaks. Additionally, the temperature data analysis subsystem 204 may further process the relevant temperature data, for example by removing validated steam leak data and/or thermal anomalies, and incorporate the resulting data into the baseline data, thereby refining and improving the baseline data.

In some embodiments, such as the embodiment described above, the temperature data analysis subsystem 204 performs image processing on images comprising the real-time temperature data and/or images comprising temperature-related parameters, and generates a processed image for display. Additionally and/or alternatively, the temperature data analysis subsystem 204 may process temperature data comprising one or more of discrete temperature or thermal information, a temperature or thermal image or images.

The image display system 108 comprises an image display 226 for displaying the processed image depicting detected relevant structures and any indications of potential steam leaks. In some embodiments, the image display 226 may additionally display the real-time temperature data or imagery of baseline data; alternatively, the image display system 108 may comprise additional displays for displaying such imagery.

Figure 3:
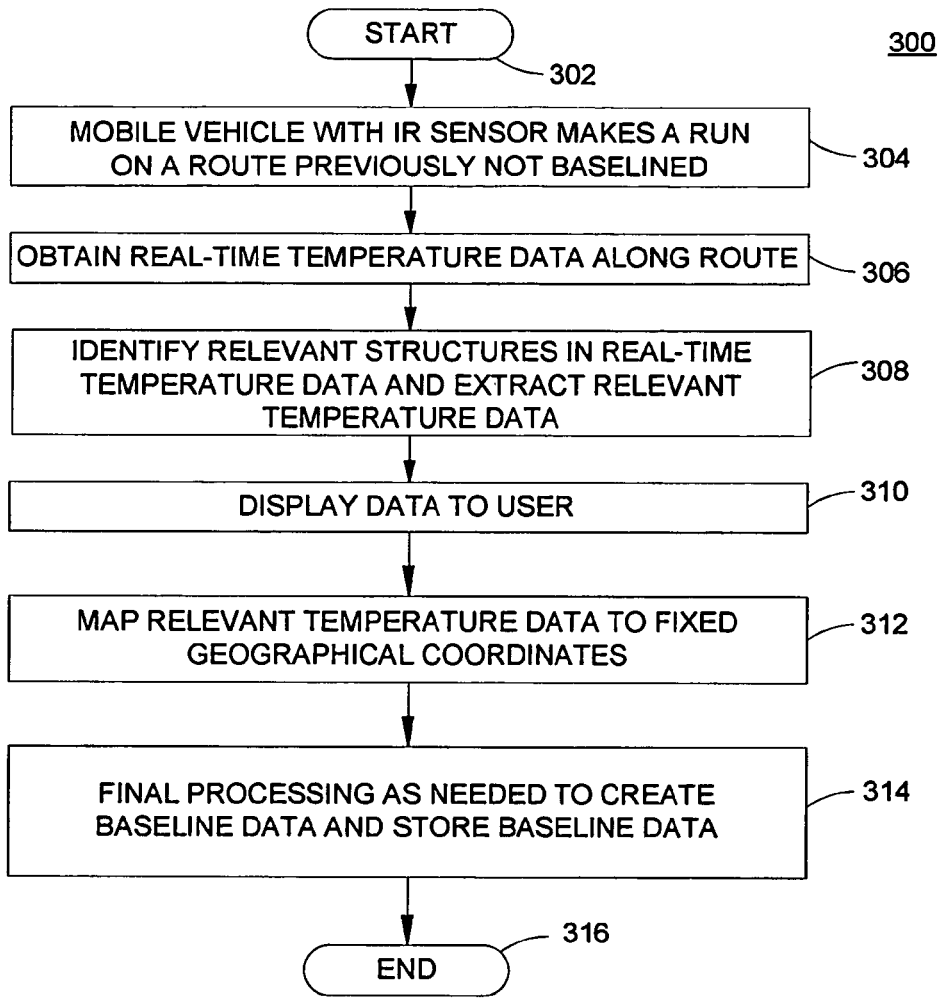
FIG. 3 is a flow diagram of a method for obtaining initial baseline data for mobile steam leak detection in accordance with one or more embodiments of the present invention.

FIG. 3 is a flow diagram of a method 300 for obtaining initial baseline data for mobile steam leak detection in accordance with one or more embodiments of the present invention. The method 300 starts at step 302 and proceeds to step 304. At step 304, a mobile vehicle equipped with an IR sensor, such as the mobile vehicle 102 and IR sensor 104, traverses a route (i.e., makes a "run") following a steam pipe system of a utility, for the purpose of obtaining baseline data. Additionally, the route is known to be free of steam leaks at the time the run is made. In alternative embodiments, any one of a variety of mobile units may be utilized to traverse the route with the IR sensor, for example the IR sensor may be mounted on a push-cart, or a person may carry the IR sensor by hand.

At step 306, real-time temperature data (e.g., thermal image data) along the route is obtained from the IR sensor. Such real-time temperature data may be displayed to a user, for example to assist in navigation along the steam-pipe route. Additionally and/or alternatively, other techniques may be used to collect temperature data along the route. Such temperature data may comprise one or more of discrete temperature or thermal information, a temperature or thermal image or images.

In some embodiments, the mobile vehicle (or mobile unit) may additionally be equipped with a standard image sensor (e.g., video camera) that images the roadway and surrounding area, as well as vehicle navigational tools, such as wheel sensors, to obtain geographical reference information for mapping the real-time temperature data and/or visual imagery to geographical coordinates as further described below.

The method 300 proceeds to step 308, where the real-time temperature data is processed to identify relevant structures of the steam pipe route represented in the data (i.e., steam pipes and manholes) and to extract relevant temperature data pertaining to the relevant structures (i.e., thermal profiles of the relevant structures). In some embodiments, such processing may be performed on images comprising the real-time temperature data and/or images comprising temperature-related parameters. Additionally and/or alternatively, such processing may be performed on temperature data comprising one or more of discrete temperature or thermal information, a temperature or thermal image or images.

In one embodiment, relevant steam pipe structures represented in the real-time temperature data are identified by creating binary images from the real-time temperature data and matching the binary images with pre-rendered images (i.e., geometric test filters) of steam pipe structures along the route.

To create the binary images, a temperature threshold is adaptively selected based on the temperature distribution in a current frame (i.e., a video image frame from the IR sensor) of the real-time temperature data. Additionally, the temperature threshold may be based on historical temperature data of the location as well as ambient conditions. A binary image of each frame of the real-time temperature data is then generated utilizing the selected threshold.

Data pertaining to a steam pipe structure along the mobile vehicle (or mobile unit) direction of motion usually exhibits a trapezoidal or rectangular shape in the real-time temperature data (i.e., within the video frame), with the exact shape and location of the trapezoid or rectangle varying as the mobile vehicle (or mobile unit) is moving and therefore changing orientation with respect to the steam pipe along the route. Thus, in order to detect relevant temperature data pertaining to steam pipe structures in the real-time temperature data, geometric test filters comprising trapezoids and rectangles are compared (i.e., applied) in real-time to each binary image. The previously rendered trapezoids and rectangles of the geometric test filters are based on a spatial range within which the steam pipe should be detected (including distance from the IR sensor), as well as possible orientations of the IR sensor.

For each binary image, the geometric test filters are applied and a "best match" is selected based on the number of pixels remaining outside of the geometric test filter area (i.e., the area of above-threshold scene); in alternative embodiments, the geometric test filters may be applied to the real-time temperature data for determining the best match. If the selected match meets further requirements, such as hot pixel density, temporal smoothness, and the like, a steam pipe structure is deemed detected; i.e., spatial and temporal filters may be applied to reduce "noise". The relevant temperature data related to the steam pipe structure can then be extracted from the real-time temperature data by applying an appropriate filter to the real-time temperature data, thereby removing temperature data not within a desired spatial range of the detected steam pipe. In some embodiments, the geometric test filter resulting in the best match may be utilized to filter the real-time temperature data; alternatively, a similar filter may be utilized to remove data that exceeds a desired spatial range around the detected steam pipe.

Manhole detection is similarly performed by creating binary images from the real-time temperature data and identifying circular areas within the binary images. The binary images are created in the same manner previously described, where a temperature threshold is adaptively selected based on the temperature distribution in a current frame of the real-time temperature data (i.e., a video image frame from the IR sensor), historical temperature data of the location, and/or ambient conditions, and a binary image of each real-time temperature data frame is generated using the selected threshold. Edge features are extracted from the binary images, and the edge points are projected onto the mobile unit coordinates (i.e., the ground coordinates of the vehicle's location). Such projection transforms an elliptical shape that would be exhibited by a manhole along the driving direction to a circular shape.

A circle detection algorithm is then applied to locate circular shapes. Analogous to the steam pipe detection, geometric test filters comprising pre-rendered circular shapes are compared to the binary images of the projected edge points, and a best match is selected as previously described. If the real-time temperature data within a detected circular region meets further requirements, such as size of the region, hot pixel density, and the like, a manhole is deemed detected. The relevant temperature data related to the manhole can then be extracted from the real-time temperature data by applying the appropriate filter to the real-time temperature data to remove image data not within a desired spatial range of the detected manhole. In some embodiments, the selected best match geometric test filters may be utilized to filter the IR image data; alternatively, a similar filter may be utilized to remove data that exceeds a desired spatial range around the detected manhole.

The method 300 proceeds to step 310. At step 310, a processed image based on the processed real-time temperature data is generated and displayed to a user. The processed image depicts indications of detected relevant structures along the route; in some embodiments, such indications may be displayed along with a pseudo-color display of the real-time temperature data.

The method 300 then proceeds to step 312, where the relevant temperature data is mapped ("geo-registered") to a fixed reference grid, e.g., geographical coordinates. Since the mobile vehicle (or mobile unit) cannot always follow the exact path of a steam pipe and since the exact positioning of the mobile vehicle (or mobile unit) cannot be identically repeated from run to run, such mapping is required in order to properly align baseline data with data from future runs for comparison. In order to geo-register the data, a fixed reference grid is generated, for example utilizing fixed landmarks, and the obtained temperature data is projected onto such a grid. The geo-registration then allows data from future runs to be compared with baseline data taken at the exact same geographical coordinates.

In one embodiment, geo-registration of the relevant temperature data may be performed using known calibration parameters of the IR sensor (such as IR sensor position, orientation, lens characteristics, and the like) to project the relevant temperature data of each frame from the IR sensor onto coordinates referenced to the mobile vehicle (or mobile unit). Additional geographical reference tools, such as GPS, image-based landmarks, dead reckoning, and the like, may then be used to project the relevant temperature data stored in the mobile vehicle (or mobile unit) referenced coordinates onto geographical coordinates. Additionally, detected manholes in the real-time temperature data can be also be utilized as geo-referencing landmarks. Since known GPS coordinates for the manholes along the route can be obtained, data pertaining to manhole structures in the real-time temperature data can be associated with the known GPS coordinates and utilized in the geo-registration. In some alternative embodiments, the real-time temperature data from the IR sensor may be geo-registered prior to extracting the relevant temperature data.

The method 300 then proceeds to step 314. At step 314, additional processing of the relevant temperature data is performed as needed to create the baseline data. For example, thermal anomalies may need to be filtered (i.e., removed) from the relevant temperature data. In one embodiment, the baseline data may be reduced to a data set containing temperature-related parameters associated with geographical coordinates. For example, for strips of temperature data at intervals perpendicular to the steam pipe path, coefficients may be computed to a generalized temperature distribution function and the coefficients stored. Reducing the baseline data in this manner may reduce storage and processing requirements on the temperature data processing system.

A plurality of baseline data sets may be created for a particular route; for example, baseline data may be created and stored based on particulars of when a route is traversed, such as by season, time of day, ambient weather conditions, and the like. In some embodiments, a plurality of baseline data scans obtained from a plurality of runs, for example runs made by one or more mobile vehicles (or mobile units), may be aggregated and processed. In such embodiments, the baseline data scans may be overlaid based on geo-registration and processed to obtain and store aggregated data, for example average values. Additionally, such average values may be stored along with other temperature-related data or parameters, such as corresponding ambient temperature values, emissitivity, and the like.

Following applicable processing, the final baseline data for the route is then stored and the method 300 proceeds to step 316 where it ends.

Figure 4:
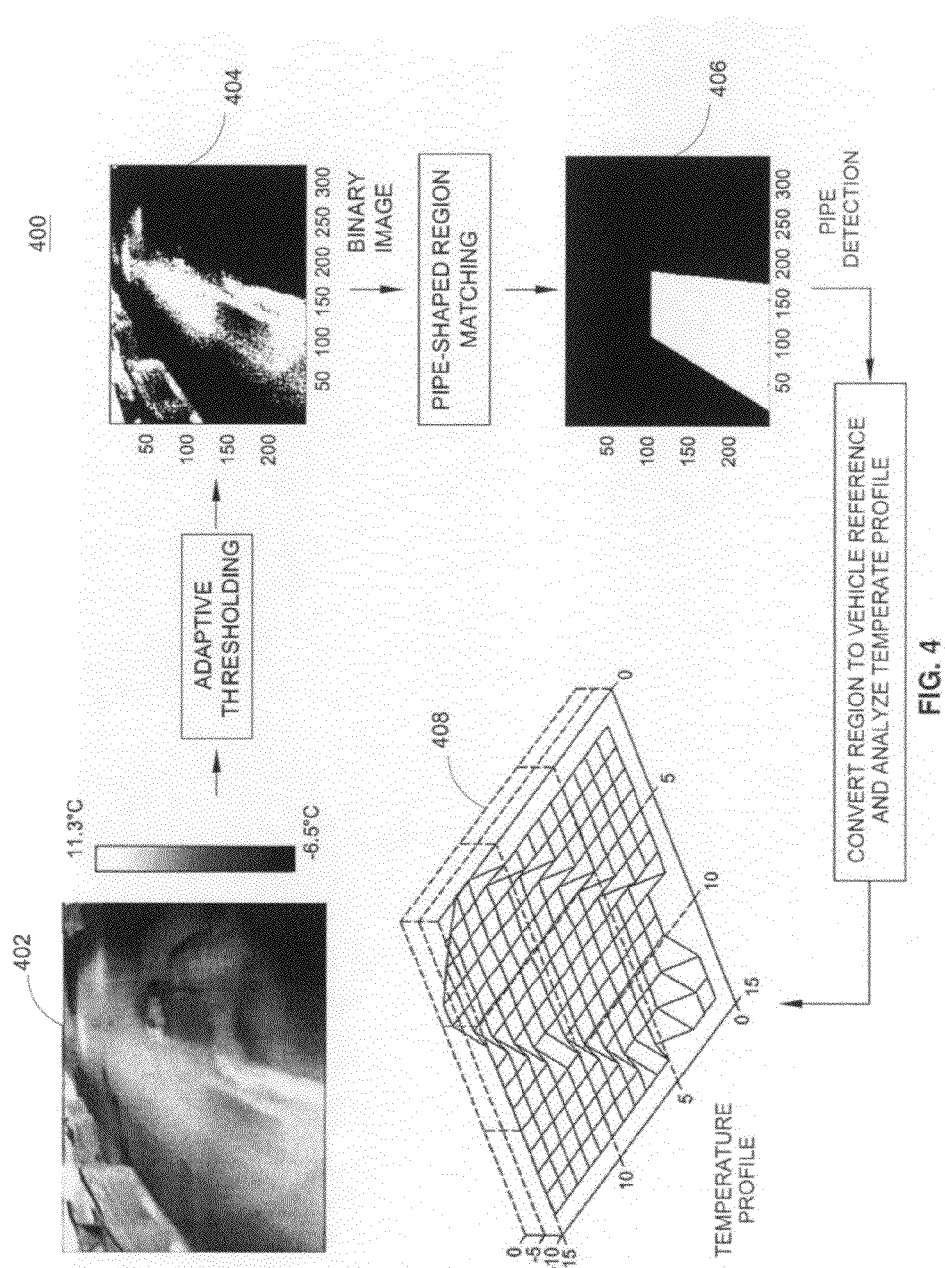
FIG. 4 is a depiction of exemplary data generated in the detection and extraction of pipe image data in accordance with one or more embodiments of the present invention.

FIG. 4 is a depiction of exemplary data generated in the detection and extraction of pipe image data in accordance with one or more embodiments of the present invention. Imagery 402 of real-time temperature data of a steam pipe route is obtained by displaying the real-time temperature data received from an IR sensor and provides a visible representation of temperatures at the surface of the steam pipe route. Such imagery may be displayed to a user utilizing a pseudo-color map to provide a full color display.

A temperature threshold is adaptively selected, as previously described, and utilized to generate binary image 404. Pre-rendered images of trapezoids and rectangles (i.e., geometric test filters) are compared to the binary image 404, and the geometric test filter resulting in the best match (i.e., the fewest pixels falling outside of the test filter area) is selected as pipe detection image 406. The imagery 402 (i.e., the real-time temperature data) is filtered by the pipe detection image 406, and the resulting relevant temperature data is mapped to vehicle reference coordinates to obtain temperature profile 408 for the detected steam pipe.

Figure 5:
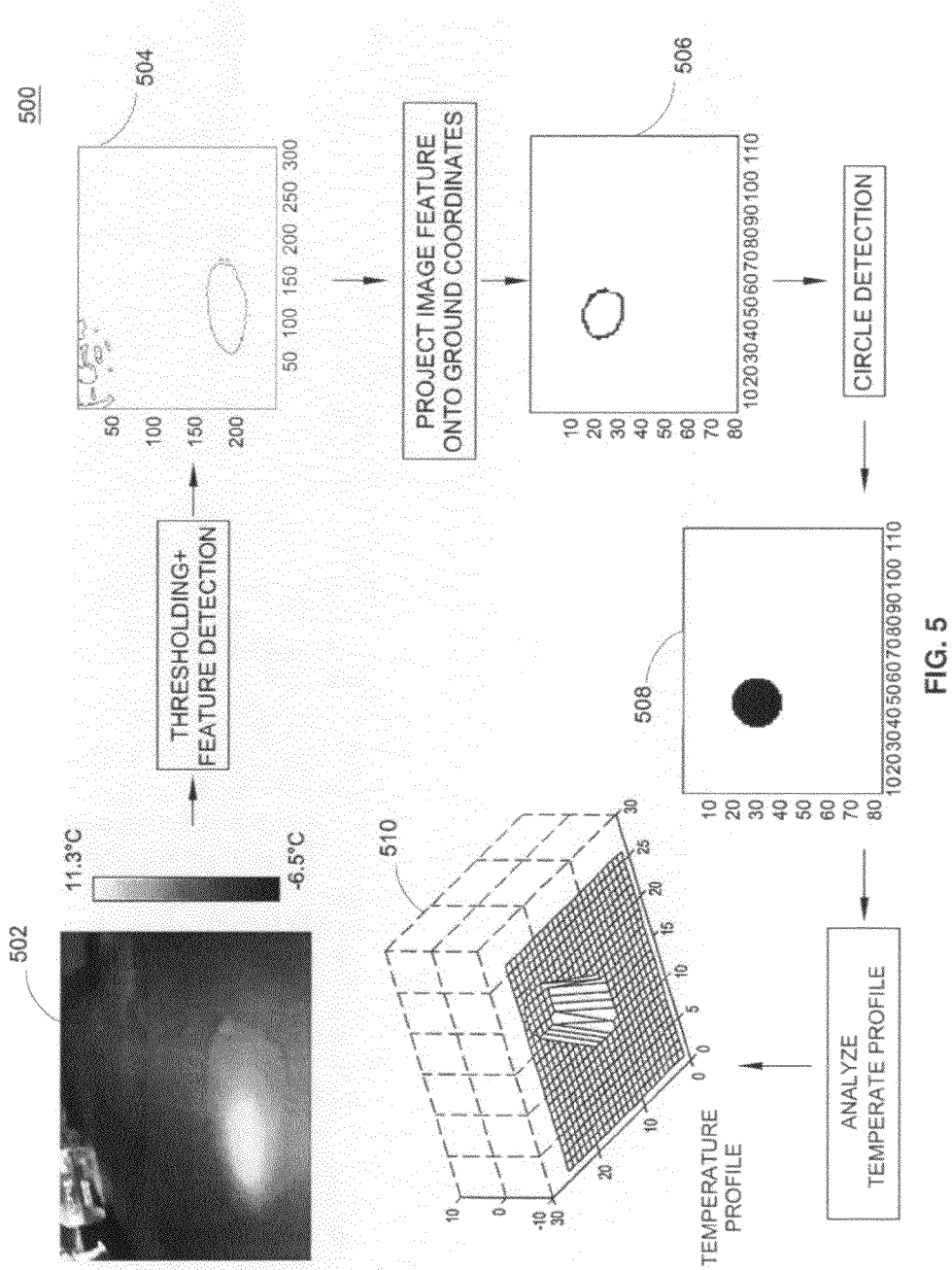
FIG. 5 is a depiction of exemplary data generated in the detection and extraction of manhole image data in accordance with one or more embodiments of the present invention.

FIG. 5 is a depiction of exemplary data generated in the detection and extraction of manhole image data in accordance with one or more embodiments of the present invention. Imagery 502 of real-time temperature data of a steam pipe route is obtained by displaying the real-time temperature data and provides a visible representation of temperatures at the surface of the steam pipe route. Such imagery may be displayed to a user utilizing a pseudo-color map to provide a full color display.

A temperature threshold is adaptively selected, as previously described, and utilized to generate a binary image. Edge features are extracted from the binary image, as shown in edge feature image 504, and projected onto the vehicle coordinates (i.e., the ground coordinates of the vehicle's location) to generate projected edge feature image 506. Such projection transforms an elliptical shape that would correspond to the shape of a manhole along the driving direction into a circular shape.

A circle detection algorithm is then applied to locate circular images in the projected edge feature image 506; i.e., geometric test filters comprising pre-rendered circular shapes are compared to the projected edge feature image 506. The geometric test filter resulting in the best match (i.e., the fewest pixels falling outside of the test filter area) is selected as manhole detection image 508. The imagery 502 (i.e., the real-time temperature data) is filtered by the manhole detection image 508, and the resulting relevant temperature data is mapped to vehicle reference coordinates to obtain temperature profile 510 for the detected manhole.

Figure 6:
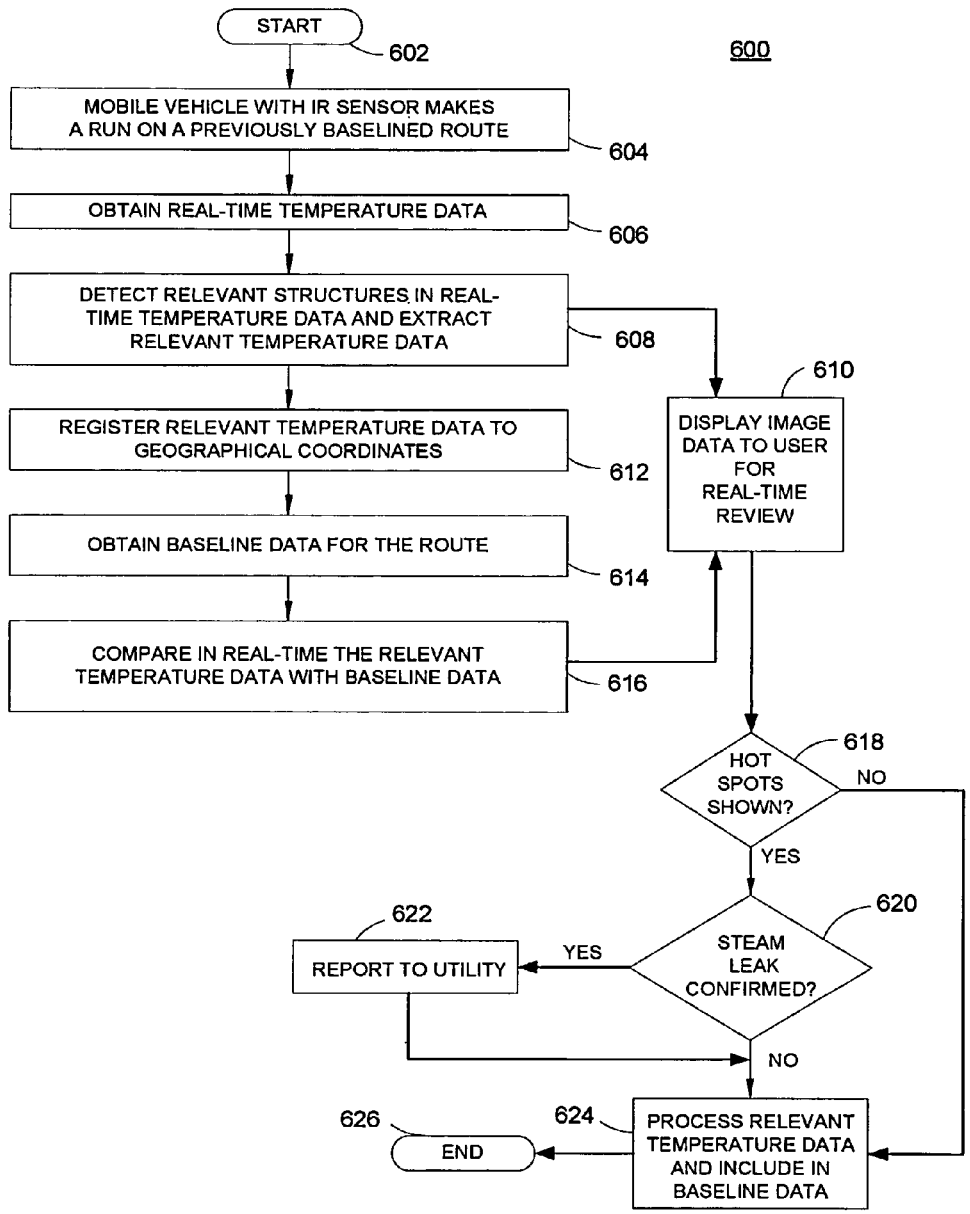
FIG. 6 is a flow diagram of a method for mobile steam leak detection in accordance with one or more embodiments of the present invention.

FIG. 6 is a flow diagram of a method 600 for mobile steam leak detection in accordance with one or more embodiments of the present invention. The method 600 starts at step 602 and proceeds to step 604, where a mobile vehicle equipped with an IR sensor traverses a route (i.e., makes a "run") following a steam pipe system of a utility, where baseline data of the route has previously been recorded. In alternative embodiments, any one of a variety of mobile units may be utilized to traverse the route with the IR sensor, for example the IR sensor may be mounted on a push-cart, or a person may carry the IR sensor by hand. At step 606, the IR sensor obtains real-time temperature data (i.e., digital radiometric image data) of the route as it is traversed; thus, the IR sensor provides real-time temperature data that forms thermal images of the steam pipe route. The real-time temperature data may be displayed to a user, for example as a pseudo-colored image, to aid in navigating the steam pipe route. Additionally and/or alternatively, other techniques may be used to collect temperature data for mobile steam leak detection. Such temperature data may comprise one or more of discrete temperature or thermal information, a temperature or thermal image or images.

In some embodiments, the mobile vehicle (or mobile unit) may additionally be equipped with a standard image sensor (e.g., video camera) that images the roadway and surrounding area, as well as vehicle navigational tools, such as wheel sensors, to obtain information for mapping the obtained IR and/or visual imagery to geographical coordinates.

The method 600 proceeds to step 608 where the real-time temperature data is processed to detect relevant structures of the steam pipe route represented in the data (i.e., steam pipes and manholes) and to extract the relevant temperature data (i.e., the surface thermal profiles of detected steam pipes and manholes) as previously described. At step 610, a processed image depicting detected relevant structures is displayed to a user. In some embodiments, pseudo-color imagery of the real-time temperature data may be displayed to the user along with a visual indication of the detected relevant structures, for example as a separate display or an overlay of the real-time temperature data imagery.

The method 600 also proceeds from step 608 to step 612, where the relevant temperature data is geo-registered to geographical coordinates, as previously described. Additionally, the geo-registered data may be stored to maintain historical data for the run. At step 614, appropriate archived baseline data for the same geographical coordinates is selected for comparison to the relevant temperature data. The appropriate baseline data may be selected based on categories of baseline data available (e.g., seasonal, time of day, ambient temperature, and the like) and current conditions during the run, as well as geographical coordinates. In some embodiments, the baseline data may consist of a data set containing temperature-related parameters associated with geographical coordinates. Such baseline data may then be "warped" based on current ambient conditions to provide derived baseline data better suited to the current conditions. In some embodiments, stored temperature-related data or parameters may be retrieved and processed in conjunction with current measured ambient temperatures to calculate expected surface temperatures for comparison to the real-time relevant temperature data.

At step 616, the baseline data is compared in real-time to the relevant temperature data to detect differences that indicate potential steam leaks. The geo-registration of the real-time relevant temperature data as well as the baseline data allows data taken at the exact same geographical coordinates to be compared. Thus, small thermal changes in a particular location (i.e., differences between the baseline data and the real-time temperature data) can be identified to detect steam leaks in early stages and provide notification to the user. Detecting such differences between baseline and real-time data may be accomplished by a variety of methods, such as video schemes that compare pixels, or by database or graphical processing methods that compare data sets containing "x" and "y" temperature-related data points.

In order to flag detected differences that indicate potential steam leaks, the method 600 proceeds to step 610 and a visual indicia of such differences is displayed. The visual indicia may be displayed, for example, as a separate image or an overlay of the displayed real-time temperature data imagery. In alternative embodiments, the visual indicia may be superimposed on a display of the baseline data, for example on a full color imagery display of the baseline data.

The method 600 proceeds from step 610 to step 618. At step 618, a determination is made whether any hot spots have been identified. If, at step 618, it is determined that no hot spots have been identified, the method 600 proceeds to step 624; in some embodiments, a report may optionally be made to the utility that no steam leaks were found. If, at step 618, it is determined that hot spots have been identified, an alternative method (such as a known acoustic or ultrasound method) may be used at step 620 to confirm whether the hot spot is due to a steam leak or not. If, at step 620, any steam leaks are confirmed, the method 600 proceeds to step 622 where a report is made to the utility. The method 600 then proceeds to step 624.

If, at step 620, no steam leaks are confirmed, the method 600 proceeds to step 624; in some embodiments, a report may be optionally made to the utility that no steam leaks were found. At step 624, the relevant temperature data is processed as needed and incorporated into the appropriate baseline data, thereby refining and improving the baseline data with each run along a route. Such processing may include filtering (i.e., removing) data pertaining to thermal anomalies or confirmed steam leaks from the relevant temperature data. The method 600 for a particular run then proceeds to step 626 where it concludes.

Figure 7:
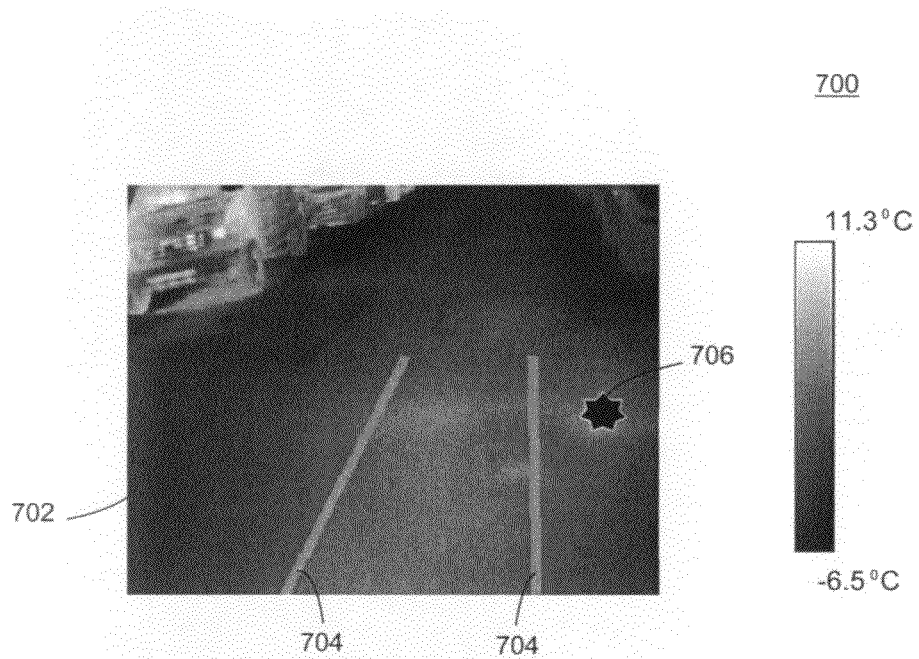
FIG. 7 is a depiction of a potential steam leak indication generated in accordance with one or more embodiments of the present invention.

FIG. 7 is a depiction of a potential steam leak indication generated in accordance with one or more embodiments of the present invention. The full-color imagery display 702 depicts the thermal profile of a steam pipe route being traversed in real time. Additionally, an indication of a detected steam pipe 704 is displayed to identify the location of the detected steam pipe. A potential steam leak flag 706, indicating a hot spot that may be due to a steam leak, is superimposed on the imagery display 702 to indicate the location of a potential steam leak. Additionally and/or alternatively, specific geographical coordinate information, such as GPS coordinates, may be displayed to the user indicating the location of the potential steam leak.

While the foregoing is directed to embodiments of the present invention, other and further embodiments of the invention may be devised without departing from the basic scope thereof.

The invention claimed is:

1. A method for steam leak detection, comprising:
   obtaining real-time temperature data representing a heat dissipation of a steam pipe along a steam pipe route;
   processing the real-time temperature data in real-time to determine at least one indication of a potential steam leak based on the real-time temperature data and to generate a processed image for display, wherein processing the real-time temperature data comprises comparing the real-time temperature data to geo-registered baseline data; and
   displaying the processed image to depict the heat dissipation of the steam pipe.

2. The method of claim 1, wherein the processed image comprises at least one of an indication of at least one relevant structure or at least one difference indicia indicating at least one difference between the real-time temperature data and the geo-registered baseline data.

3. The method of claim 2, wherein the at least one difference indicia is determined by:
   detecting the at least one relevant structure represented in the real-time temperature data;
   extracting relevant temperature data pertaining to the at least one relevant structure from the real-time temperature data;
   geo-registering the relevant temperature data to a fixed reference to generate geo-registered relevant temperature data;
   selecting the geo-registered baseline data; and
   detecting at least one difference between the geo-registered relevant temperature data and the geo-registered baseline data.

4. The method of claim 3, wherein the detecting the at least one relevant structure comprises:
   generating a binary image from the real-time temperature data;
   filtering the binary image utilizing a plurality of geometric filters to generate a plurality of filtered binary images;
   selecting a best match from the plurality of filtered binary images; and evaluating the best match for at least one of hot pixel density, temporal smoothness, or size.

5. The method of claim 4, wherein the generating a binary image utilizes an adaptively selected temperature threshold, the adaptively selected temperature threshold determined based on at least one of a temperature distribution of the real-time temperature data, historical temperature data of the steam pipe route, or ambient conditions of the steam pipe route.

6. The method of claim 3 wherein the extracting comprises filtering data from the real-time temperature data that exceeds a desired spatial range around the at least one relevant structure.

7. The method of claim 3, wherein the geo-registering comprises:
utilizing at least one known calibration parameter of an infrared (IR) sensor performing the obtaining real-time temperature data to obtain mobile unit referenced coordinates for the relevant temperature data; and
utilizing at least one geographical reference tool to project the mobile unit referenced coordinates onto geographical coordinates.

8. The method of claim 3, wherein the geo-registering comprises utilizing at least one of (i) global positioning system (GPS) coordinates or (ii) at least one of the at least one relevant structures represented in the real-time temperature data and at least one relevant structure represented in the geo-registered baseline data.

9. The method of claim 3, wherein the detecting at least one difference utilizes at least one of a video comparison of pixels or a processing method for comparing data sets comprising x-axis and y-axis temperature-related data points.

10. The method of claim 2, wherein the geo-registered baseline data is obtained by:
detecting the at least one relevant structure represented in previously obtained temperature data along the steam pipe route;
extracting relevant baseline data pertaining to the at least one relevant structure from the previously obtained temperature data;
geo-registering the relevant baseline data to a fixed reference to generate geo-registered relevant baseline data; and
processing the geo-registered relevant baseline data.

11. The method of claim 10, wherein the processing the geo-registered relevant baseline data comprises at least one of filtering the geo-registered relevant baseline data or reducing the geo-registered relevant baseline data to a data set comprising temperature-related parameters associated with geographical coordinates.

12. The method of claim 2, wherein the geo-registered baseline data is comprised of a data set of temperature-related parameters associated with geographical coordinates.

13. A system for steam leak detection comprising:
an infrared (IR) sensor for obtaining real-time temperature data representing a heat dissipation of a steam pipe along a steam pipe route;
a temperature data processing system for processing the real-time temperature data in real-time to determine at least one indication of a potential steam leak based on the real-time temperature data and to generate a processed image for display, wherein processing the real-time temperature data comprises comparing the real-time temperature data to geo-registered baseline data; and
an image display system for displaying the processed image in real-time to depict the heat dissipation of the steam pipe.

14. The system of claim 13 wherein the temperature data processing system comprises:
a temperature data capture subsystem for capturing the real-time temperature data from the IR sensor; and
a temperature data analysis subsystem for performing the processing and storing at least one of the geo-registered baseline data, at least a portion of the real-time temperature data, or temperature-related parameters derived from the real-time temperature data.

15. The system of claim 13, wherein the processed image comprises at least one of an indication of at least one relevant structure or at least one difference indicia indicating at least one difference between the real-time temperature data and the geo-registered baseline data.

16. The system of claim 13, wherein the image display system comprises a real-time image display for displaying at least one of the real-time temperature data or the processed image.

17. The system of claim 13, wherein the IR sensor is a forward looking infrared (FLIR) A40M IR camera.

18. The system of claim 13, wherein the temperature data processing system is a commercially available laptop computer.

19. The system of claim 13, wherein the temperature data processing system further comprises a global positioning system (GPS) unit for providing geographical coordinate information.

20. The system of claim 15, wherein the geo-registered baseline data is comprised of a data set of temperature-related parameters associated with geographical coordinates.

* * * * *